May 14, 1968     C. GOULD     3,383,276
EXTRUDED SYNTHETIC FILAMENT
Filed March 10, 1964
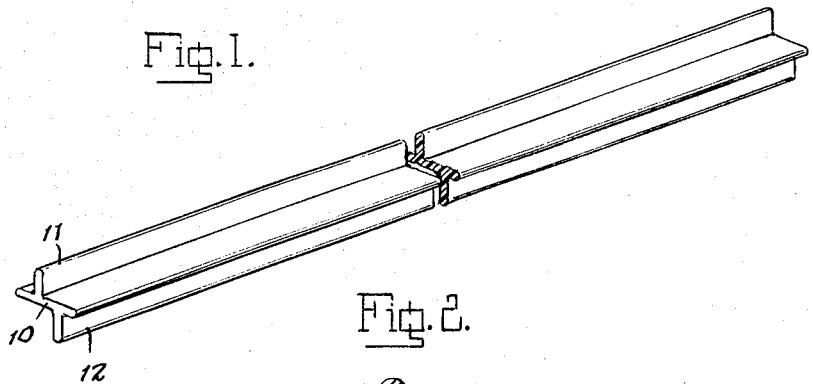
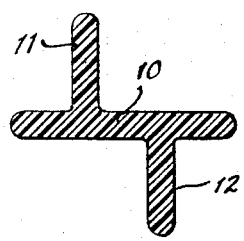
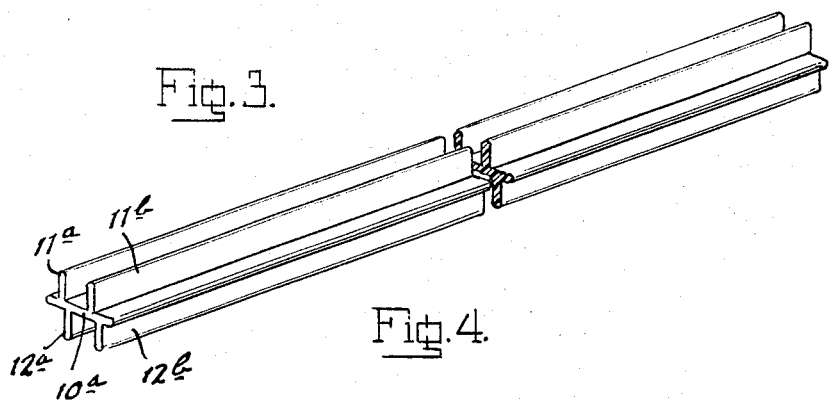
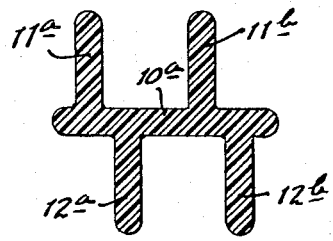
INVENTOR.
CHARNA GOULD
BY
ATTORNEY 3,383,276
EXTRUDED SYNTHETIC FILAMENT
Charna Gould, 280 Badger Ave.,
Millburn, N.J. 07041
Filed Mar. 10, 1964, Ser. No. 350,764
1 Claim. (Cl. 161—177)

This invention relates to extruded synthetic filaments especially adapted for use in suitably cut lengths as brush bristles, as the acicular or needle-like foliage of artificial Christmas trees and wreaths, and in other similar applications. It is particularly proposed to provide a filament in the form of a linearly oriented extrusion of thermoplastic material, for example nylon, polypropylene or the like. An object of the invention is to provide a filament having a maximum of surface area, to impart relatively great bulk to the filament, and a minimum of material, for the purpose of achieving light weight and substantial economy without sacrifice of the desirable characteristics of stiffness, resiliency, and durability.

In the extrusion of thermoplastic materials of the type contemplated herein, a characteristic of the extrusion procedure of forcing the plasticized material through a die having the desired cross-sectional shape of the filament is that a substantially greater pressure and flow of material exists at the center of the die opening than toward the periphery, with the result that the material at the center of the filament as it flows from the die has substantially greater density than the remainder of the material and, as a consequence, during the following procedures of quenching, heating and stretching the filament to achieve linear orientation, the center or core of the filament tends to expand or distort beyond a cross-sectional shape corresponding to the die opening. This is particularly true of a die opening having a relatively large center or a center from which parts of the die opening radiate. In this respect it is pointed out that it has heretofore between proposed to provide an extruded synthetic filament having a cross-sectional shape wherein three or more webs radiate at equal angles to each other from a common center which is also the geometric center of the filament. With this type of filament the characteristic extrusion principle of greater pressure and flow of material from the center of the die opening results in a substantial thickening of the core of the filament with a consequent increase in the mass of material employed and a decrease in the surface area.

It is an object of the invention to provide a filament having a cross-sectional shape capable of being produced by extrusion with a substantial reduction or elimination of the distortional effect of the greater pressure and flow of material at the center of the die opening. An exemplary embodiment of the invention for carrying out this object consists of a relatively thin strip-like center or body portion which in cross-section extends in a straight line diametrically across the full width of the filament, and a plurality of fin-like portions extending at right angles therefrom in outwardly spaced relation to the geometric center of the filament and in non-aligned relation to each other, so that no two fins have a common point of connection with the central body portion.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

FIG. 1 is a perspective view partially broken away of a length of synthetic filament according to the invention;

FIG. 2 is an enlarged cross-sectional view of the filament as seen in FIG. 1;

FIG. 3 is a perspective view partially broken away of a length of synthetic filament according to a modified form of the invention;

FIG. 4 is an enlarged cross-sectional view of the filament as seen in FIG. 3.

Referring to the drawings and more particularly to FIGS. 1 and 2, the synthetic filament shown by way of example therein comprises a central body portion 10 of substantially flat strip-like forming having parallel side surfaces and parallel longitudinal edges, and which in cross-section extends in a straight line diametrically across the full width of the filament. At a point intermediate the central area of the body portion 10 and one longitudinal edge a fin 11 is integrally connected to one side of the body portion and extends outwardly therefrom at right angles thereto, this fin preferably having parallel sides and being of a thickness substantially corresponding to the thickness of the body portion. A similar longitudinal fin 12 is similarly integrally connected to the opposite side of the body portion at a point intermediate the central area of the body portion and its other longitudinal edge and extends outwardly therefrom at right angles thereto. Thus the fins 11 and 12 are outwardly spaced from the central area of the body portion, they are out of alignment with each other, and do not have a common point of connection with the body portion.

The right-angular relationship of the fins 11 and 12 to the body portion is the preferred geometric shape to give to the filament the maximum surface area or bulk factor. The preferred dimensional relationship between the fins and the body portion is one wherein the distance between parallel planes coinciding with the outer extremities of the two fins corresponds to the length of the body portion, so that the geometrical cross-sectional configuration of the filament will fit into a square. This configuration provides the maximum stiffness factor to the filament, although it will be understood that in applications where a lesser degree of stiffness is permissible or desirable this dimensional relationship may be changed.

The off-center relationship of the fins with respect to the body portion provides a cross-sectional shape at the geometric center of the filament which minimizes or eliminates the distortional or expansion effect that may be caused by the greater density of the thermoplastic material in the central area of the filament due to the extrusion principle of greater pressure and flow of the material at the center of the extrusion.

The filament according to the invention is formed of a suitable thermoplastic material, for example nylon, polypropylene or the like, capable of extrusion and linear orientation by known procedures. The size of the filament, i.e., the width of one side of the square into which the cross-sectional shape of the filament will fit, may vary over a wide range, for example .004" for use as the bristles of small brushes, as simulated Christmas tree needle, and the like, to .250" for large brush bristles such as may be used in street sweeping brooms.

In the modification shown in FIGS. 3 and 4, a pair of fins 11a and 11b extend outwardly at right angles from one side of the body portion 10a and a pair of fins 12a and 12b extend outwardly at right angles from the opposite side, the fins at each side being outwardly spaced from the central area of the body portion and being out of alignment with the fins at the opposite side, so that no two fins have a common connection with the body portion.

What is claimed is:

1. A relatively stiff synthetic filament, in the form of a linearly oriented extrusion of thermoplastic material, suitable for use as a brush bristle, as artificial acicular foliage, or the like comprising a centrally disposed strip-like body portion having a substantially uniform cross-section comprising transversely straight parallel sides and parallel longitudinal edges, and a fin portion integral with and projecting outwardly at right angles from each of the opposite sides of said body portion in outwardly spaced relation to the central area of said body portion; said fin portions being in non-aligned relation to each other; one said fin portion being intermediate said central area and one longitudinal edge of said body portion and the other said fin portion being intermediate said central area and the other longitudinal edge of said body portion; each of said fin portions including the same number of fins; said body portion and said fin portions being of substantially corresponding thickness; the width of said body portion substantially corresponding to the distance between parallel planes coinciding with the outer edges of said fin portions; the length of one side of the square into which the cross-section of the filament will snugly fit being substantially within the range of .004 to .250 inch; and said central area presenting exposed parallel side surfaces free of projecting fins.

References Cited

UNITED STATES PATENTS

| | | | |
|---|---|---|---|
| 2,968,857 | 1/1961 | Swerdloff et al. | 161—173 |
| 3,156,607 | 11/1964 | Strachan | 57—140 |

FOREIGN PATENTS

| | | |
|---|---|---|
| 381,456 | 10/1932 | Great Britain. |
| 621,796 | 4/1949 | Great Britain. |
| 837,285 | 6/1960 | Great Britain. |

ROBERT F. BURNETT, *Primary Examiner.*

EARL M. BERGERT, ALEXANDER WYMAN,
*Examiners.*

A. J. SMEDEROVAC, R. A. FLORES, L. M. CARLIN,
*Assistant Examiners.*